United States Patent [19]

Bumpus et al.

[11] 3,917,580

[45] Nov. 4, 1975

[54] DES-ASP$^1$-THR$^8$ ANGIOTENSIN II AS A SPECIFIC INHIBITOR FOR THE RELEASE OF ALDOSTERONE

[76] Inventors: Francis Merlin Bumpus, 75 Winterberry Lane, Chagrin Falls, Ohio 44022; Mahesh Chandra Khosla, 7415 Warwick Lane, Chesterland, Ohio 44026; Robert Rudolph Smeby, 36801 Riviera Road, Willoughby, Ohio 44094

[22] Filed: June 20, 1974

[21] Appl. No.: 481,084

[52] U.S. Cl............................. 260/112.5; 424/177
[51] Int. Cl.$^2$................. C07C 103/52; A61K 37/00
[58] Field of Search.................. 260/112.5; 424/177

[56] References Cited

OTHER PUBLICATIONS

Allmann et al., Chem. Abst. 76:122,201f (1972).

*Primary Examiner*—Lewis Gotts
*Assistant Examiner*—Reginald J. Sayat
*Attorney, Agent, or Firm*—Paul D. Burgauer; Robert L. Niblack

[57] ABSTRACT

A new heptapeptide having specific inhibitory properties for the release of aldosterone from the adrenal cortex has been found. The new compound resembles angiotensin II except for the two terminal amino acids. The N-terminal amino acid (aspartic acid) is absent, while the C-terminus is occupied by L-threonine.

1 Claim, No Drawings

DES-ASP[1]-THR[8] ANGIOTENSIN II AS A SPECIFIC INHIBITOR FOR THE RELEASE OF ALDOSTERONE

DETAILED DESCRIPTION OF THE INVENTION

This invention relates to polypeptides. More particularly, it is concerned with the heptapeptide of the formula:

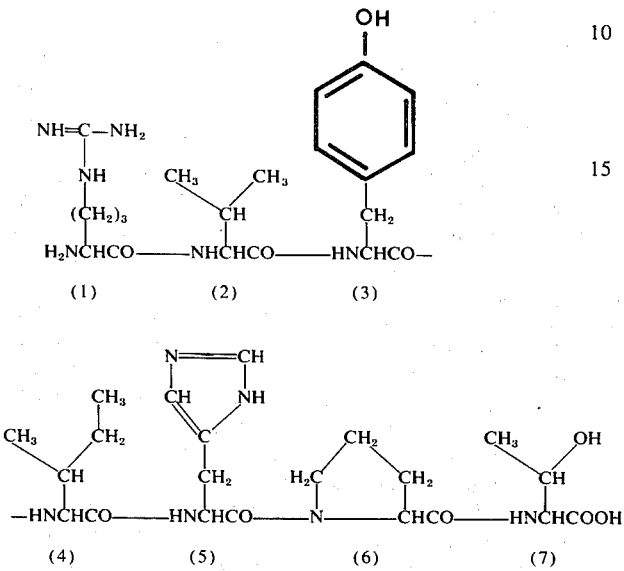

which is more easily referred to as the heptapeptide chain identified as:

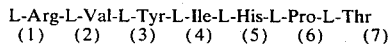

L-Arg-L-Val-L-Tyr-L-Ile-L-His-L-Pro-L-Thr
 (1)   (2)   (3)   (4)   (5)   (6)   (7)

The peptide of this invention possesses valuable pharmacological activity. It is capable of inhibiting the angiotensin II stimulated release of aldosterone from adrenal cortex while at the same time inhibiting only poorly the other physiological effects of angiotensin II. Thus, when administered in very small amounts by infusion into peripheral veins of dexamethasone treated bilaterally nephrectomized dogs, the excretion of aldosterone was inhibited. Other peptide analogs of angiotensin II which inhibit the pressor effect of angiotensin II, such as [Ile[8]]-, or [Ala[8]] angiotensin II, demonstrate this aldosterone inhibitory activity weakly or not at all. By virtue of this selective inhibitory property upon the release of aldosterone, the peptide of this invention is a valuable agent for counteracting a number of human diseases in which elevated aldosterone is a causative factor such as edematous disorders, congestive heart failure and hypertension.

The heptapeptide of this invention is readily prepared in accordance with known methods for preparing peptides. Such methods involve the building of a linear chain of amino acids through repetitive amide linkages employing in such sequential alignment the necessary protective groups susceptible to ready removal by conventional cleavage methods which do not affect the peptide bonds. The adaptation of such methods to the peptide of this invention is described in the example below. All the amino acids used in the above structure of Formula I are in the L-configuration. The corresponding chain with D-amino acids does not show the pharmacological effect described below.

In order to illustrate the method for making the compound of structure I, reference is made to the following example, which however, is not intended to limit the invention in any respect. In this example, the abbreviation BOC- is used in its accepted meaning, referring to tertiary butyloxycarbonyl. It also should be understood that all amino acids used in this example are in their L-configuration. The BOC-amino acids used below are either commercially available or were prepared according to the method of Schwyzer et al., Helv. Chim. Acta 42, 2622 (1959).

EXAMPLE

A solution of 3.09 g of BOC-(O-benzyl)-threonine and 1.4 ml. of triethylamine in 50 ml. of ethylacetate was added to 10 g. of chloromethylpolystyrene/divinylbenzene (98:2) copolymer of a mesh size between 200 and 400, containing 5.02% chlorine. The mixture was stirred at 80°C. for 36 hours. The esterified polymer was filtered, washed several times, in sequence, with ethanol, dilute acetic acid, water, ethanol and methanol. The polymer was dried in vacuo over phosphorous pentoxide. Hydrolysis of an aliquot of the polymer and subsequent amino acid analysis indicated that 0.11 millimoles of BOC-(O-benzyl)-threonine were esterified per gram of the polymer. Further coupling of the BOC-proline, BOC-N-imidazolebenzyl-histidine, BOC-isoleucine, BOC-(O-benzyl)-tyrosiine, BOC-valine and BOC-nitroarginine in the respective order was carried out by utilizing the action given below for each amino acid residue. Unless specified, all washings were carried out three times for three minutes each, first with glacial acetic acid and second with methylene chloride. The BOC group was removed by treatment with 40% (volume/volume) of trifluoroacetic acid in methylene chloride for 30 minutes, preceded by a prewash with this reagent for 3 minutes to avoid dilution of the trifluoroacetic acid by the previous methylene chloride wash. The deprotected amino acid polymer ester was washed five times for 3 minutes each with chloroform and the trifluoroacetic salt neutralized by treating the residue for 7 minutes with 10% triethylamine in chloroform, followed by three 3-minute washings with chloroform and methylene chloride in sequence. The subsequent incoming BOC-amino acid was added in a 2-fold excess in methylene chloride and the mixture was stirred for 10 minutes. In the case of BOC-nitroarginine and BOC-benzyl histidine, these materials were first dissolved in dimethylformamide, followed by filtration and mixing the filtrate with one-third volume of methylene chloride. Both of these derivatives were used in 3-fold excesses. Coupling was aided in each instance by the addition of a 2-fold excess of dicyclohexylcarbodiimide in methylene chloride and mixing was carried out for 2.5 hours except in the coupling steps involving Arg or His where DCI was used in a 3-fold excess and mixing allowed for eight hours. The polymer-peptide chain was then washed with DMF followed by a washing with DMF/methylene chloride (1:1) and the coupling step with the BOC-amino acid and DCI was repeated using a mixture of 1:1 DMF/methylene chloride as the solvent. The polymer chain was then washed with methanol to remove dicyclohexylurea and finally washed with DMF. Completeness of each coupling at intermediate stages was checked by known color reaction tests. All couplings were carried out at 0°–5°C. to avoid racemization; 1-hydroxybenzotriazole was used as an additive to minimize racemization of histidine during the coupling of BOC-imidazolebenzyl histidine [see G. C. Windridge and E. C. Jorgensen, J.A.C.S., 93, 6318 (1971)].

In the above sequence, the blocked (protected) amino acids were coupled in sequence to the O-benzyl threonine polymer, using BOC-proline, BOC-N-imidazole-benzyl-histidine, BOC-isoleucine, BOC-(O-benzyl))-tyrosine, BOC-valine and BOC-nitroarginine to produce a peptide of the structure of formula I with amino acids 1 – 7 bound to the polymer substrate.

The above protected heptapeptide polymer was suspended in approximately 100 ml. of freshly distilled trifluoroacetic acid and a slow stream of hydrogen bromide, prewashed with 10% resorcinol in acetic acid, was passed through the suspension under anhydrous conditions for about 30 minutes with occasional shaking. The suspension was filtered and the polymer was washed with trifluoroacetic acid. The combined filtrates were evaporated at room temperature in vacuo. The amorphous powder was washed with ether, dissolved in a mixture of methanol/acetic acid/water 10:1:1 and the solution hydrogenated at 3.5 kg./cm.$^2$ over 0.5 parts of palladium black per part of peptide weight for 48 hours with shaking. The product was purified on a 5 × 80 cm. column of Sephadex G 25 (a partially cross-linked dextran gel having an exclusion of molecular weight sizes of > 5000, marketed by Pharmacia of Uppsala, Sweden) using n-butanol/pyridine/water (10:2:5) as the developing solvent. The average yield of the product obtained in this manner varied between 40 and 60% based on the millimoles of C-terminal amino acid esterified onto the polymer. Fractions in column chromatography were cut without regard for yield to obtain the desired compound in the pure form and no attempt was made to rechromatograph the minor fractions for identification purposes. The homogeneity of the compound was determined by thin-layer chromatography in various solvent systems of different pH, electroporesis at pH 1.95 and 8.6 and amino acid analysis, proving that the compound is homogeneous with $R_f$ 0.45 (n-butanol/acetic acid/water 4:1:5) and $R_f$ 0.67 (n-butanol/ethylacetate/acetic acid/water 1:1:1:1), $R_f$ 0.17 (n-butanol/pyridine/water 10:2:5), $R_f$ 0.52 (n-butanol/acetic acid/water/pyridine 15:3:12:10) on cellulose thin-layer plates. The chemical analysis showed that the required amino acids were present in the expected ratio.

For studying the inhibitory properties for the excretion of aldosterone, male mongrel dogs (20–25 kg) were bilaterally nephrectomized and were treated with dexamethasone to suppress the secretion of adrenocorticotropic hormone (ACTH). Arterial pressure was monitored continuously through an indwelling catheter in the femoral artery. Infusates were given into peripheral veins and timed samples of adrenal venous effluent for steroid determinations were collected from the left lumboadrenal vein. Angiotensin II was first infused at constant doses of 20 ng/kg/min for 15 minutes followed by the heptapeptide of the structure I. Plasma aldosterone was measured by a radioimmunoassay method as described by Farmer et al. (J. Clin. Endocrinol. Metab. 36, 460, 1973). The results indicate that the heptapeptide blocked the secretion of aldosterone at a dose level of 200 ng to 800 ng/kg/min.

Since the above compound is particularly suitable for injection or infusion, it is particularly valuable that the compound is water-soluble. A suitable dosage unit can be prepared by simply dissolving the above compound in water or physiological saline at a concentration of between 50 and 6000 ng/ml. Such a solution can be administered directly or it can be stored under proper conditions for periods of several weeks without deterioration, particularly when combined with 1 – 5% of a preservative such as benzyl alcohol and/or is buffered to a suitable pH with a nontoxic, pharmaceutically acceptable buffer. A commonly employed buffer for an injectable solution is tris(hydroxymethyl)aminomethane but simple salts such as sodium phosphate or acetate can be used. Preferably, the vehicle or medium in which the compound of formula I is dissolved for an injectable or infusable solution is buffered to a pH of 7 to 7.5.

What is claimed is:

1. The heptapeptide L-Ary-L-Val-L-Tyr-L-Ile-L-His-L-Pro-L-Thr.

* * * * *